Jan. 24, 1967  C. P. TRESSELT  3,300,715

TWO PROBE STANDING WAVE NULL DETECTOR

Filed Jan. 24, 1963

INVENTOR.
CARL P. TRESSELT

BY
Richard J. Seeger
ATTORNEY

United States Patent Office 3,300,715
Patented Jan. 24, 1967

3,300,715
TWO PROBE STANDING WAVE NULL DETECTOR
Carl P. Tresselt, Detroit, Mich., assignor to The Bendix Corporation, Southfield, Mich., a corporation of Delaware
Filed Jan. 24, 1963, Ser. No. 253,564
8 Claims. (Cl. 324—58.5)

This invention pertains to a two probe device for detecting nulls of a standing wave in a transmission line utilizing a probe which has a fixed entrance into the transmission line and is capable of sensing the magnitude and phase of the standing wave in the transmission line at the point of entrance and a probe which has a movable entrance into the transmission line and is also capable of sensing the magnitude and phase of the standing wave at its point of entrance.

Two probe detectors are known to the art, for example, U.S. Patent No. 2,967,996, Magnetron Tester, by Henry K. Bradford, issued Jan. 10, 1961, illustrates a typical system having two probes in fixed relation to each other and which are movable relative the transmission line. This type system has proven disadvantageous because the null would be located by centering it between the two probes. Each probe would cause discontinuities at the point of measurement which set up standing waves of their own and hence interfere with accurate measurements. In this invention only one probe is used at the point of measurement and this probe locates the null by being positioned exactly at the null where there is zero field so that any discontinuity effect is negligible. Also, in the prior systems the probes themselves and all the elements in each probe circuit had to be very carefully matched in order for accurate measurements whereas in applicant's system such matching requirements are not necessary. The preferred embodiment of this invention is adapted to be used with the invention in a copending application entitled Measuring Gauge, Serial No. 216,592, filed August 13, 1962, by Carroll F. Augustine and myself. In the preferred embodiment the probe is moved and then the null is moved until it is under the probe. However, the principles are similar whether the probe is moved to find the null or the null is moved to find the probe.

In this invention one probe is fixed at a point in a slotted transmission line approximately one quarter of the standing wave length from the general area where the standing wave null will detect the movable proble position. The movable probe is moved in this area by an object the displacement of which is to be measured. The fixed probe is on the side of the movable probe which is away from the shorted end of the transmission line so that the discontinuities cause by the fixed probe will have a minimum effect on the standing wave. The frequency in the transmission line is varied until the null comes under the new probe position and by measuring the frequency, a very accurate determination of probe movement may be obtained. This measuring concept is covered in detail in the above cited copending application.

In this invention means for measuring the phase difference between the fixed and movable probes are provided. In a first embodiment the probe outputs are connected to symmetric arms of a magic tee while the sum arm and difference arm of the magic tee are connected to oppositely polarized diodes. The output of the diodes is measured and when it is zero, the moving probe is at a null, and when it has a plus sign it is on one side of a null and a minus sign it is on the other side of a null. A servo system may then be employed to change the frequency in the transmission line until a null is at the movable probe whereby the exact displacement of the movable probe may be determined.

A further embodiment of this invention is comparing the phase between the movable and fixed probe. In this embodiment a movable and fixed probe are connected to mixers which are driven by a local oscillator. By comparing the phase from the mixers it can be determined when the movable probe is at a null. This superheterodyne embodiment has the advantage of lower noise and the ability of amplify at an intermediate frequency level.

In the last embodiment, a servo system also may be employed to change the frequency of the signal in the transmission line until a node appears at movable probe to exactly measure the displacement of the movable probe.

It is therefore an object of this invention to provide a two probe null detector system with discontinuities set up by the probes having a minimum effect on the null detection construction. A further object is to provide phase comparison systems for said probes of inexpensive and reliable operation.

These and other objects will become more apparent when preferred embodiments are considered in connection with the drawings in which.

Figure 1:
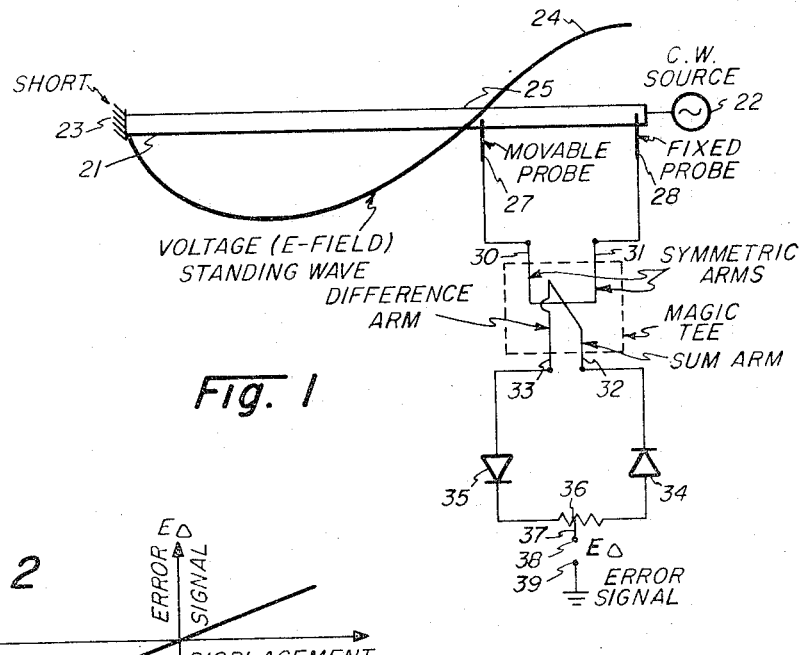
FIGURE 1 is a schematic diagrammatic drawing of a first embodiment of this invention utilizing a magic tee as the phase comparator.

In FIGURE 1 is shown a transverse electromagnetic (T.E.M.) slotted transmission line 21 which has a constant wave signal source 22 at one end thereof and is shorted at end 23. A standing wave 24 is formed in the transmission line 21 and it is desirable to place the node 25 of the standing wave exactly over a predetermined point such as the position of a movable probe 27. This can be done by varying the frequency of source 22 until the node 25 is over probe 27. In this application it is desirable to know exactly how far the probe 27 is from the shorted end 23 and this can be determined by knowing the frequency necessary to place node 25 over probe 27.

The means for determining when node 25 is precisely, over, probe 27 will now be described. A second probe 28 is fixed in relation to transmission line 21 and is placed on the side of probe 27 away from shorted end 23 so that any discontinuities caused by probe 28 will not affect the standing wave 24 at the point of measurement. The fixed probe 28 will be somewhere near the maximum voltage of the standing wave, but need not be at the maximum voltage, since the movement of movable probe 27 will be within small limits compared with the length of the standing wave 24.

The output of the movable probe 27 is connected to one of the symmetric arms 30 of a magic tee and the output of the fixed probe 28 is connected to the other symmetric arm 31 of the magic tee. It is a property of the magic tee to add the signals from arms 30 and 31 in the sum arm 32 and subtract the signals in the difference arm 33. This is explained in Electronic and Radio Engineering by Terman, fourth edition, published by McGraw-Hill on pp. 156–157. The time phase of the signal on one side of the null in the standing wave is almost exactly 180° out of phase with the signal on the opposite side of the null, due to the essentially infinite magnitude of the standing wave ratio. Hence the signals processed by the magic tee are either in or directly out of phase and thus add algebraically; the magnitude of the radio frequency signal at one arm of the magic tee output will be larger than that of the other, the order depending upon which side of the null the movable probe is located.

The sum arm 32 is connected to a detector 34 having one polarity and the difference arm 33 is connected to a second detector 35 having the opposite polarity. The outputs of detectors 34 and 35 are connected across a resistance 36 and a pointer 37 which is adjusted to give a zero reading across terminals 38 and 39 when probe 27 is at null 25. In practice a servo system would be connected across terminals 38 and 39 to vary the frequency of standing wave 24 until the node 25 was in alignment with movable probe 27. When aligned, the discontinuities created by probe 27 have a minimum effect on the standing wave 24, improving accuracy.

Figure 2:
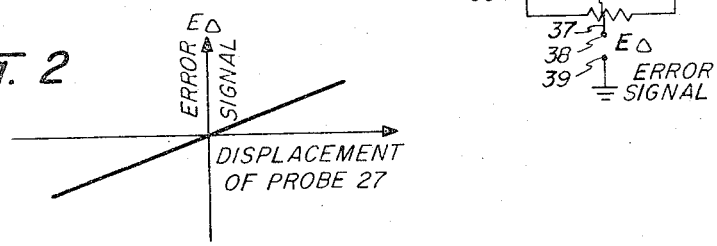
FIGURE 2 is a graph showing the error signal versus the displacement of the movable probe.

In FIGURE 2 is shown a graph of the error signal which appears across terminals 38 and 39 versus the displacement of movable probe 27. It can be seen that as null moves to one side of probe 27, a minus voltage is picked up by the probe and as it moves to the other side a positive voltage is picked up by the probe.

Figure 3:
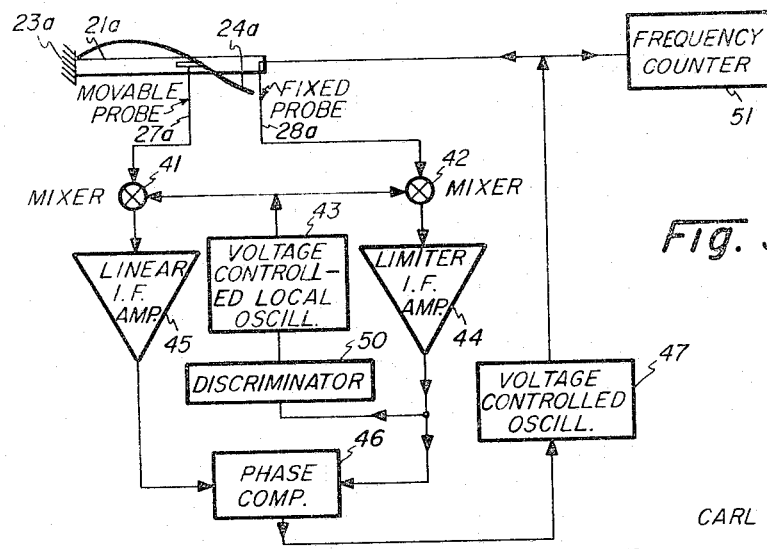
FIGURE 3 is a schematic diagrammatic view of a second embodiment of this invention utilizing a superheterodyne circuit for comparing the phase in the movable and fixed probe.

A second embodiment shown in FIGURE 3 for measuring the phase difference between a fixed probe 28a and a movable probe 27a. In this embodiment the outputs of probe 27a and 28a, respectively, are connected to mixers 41 and 42 which are driven by voltage controlled local oscillator 43. The difference frequencies or intermediate frequencies from the mixer 42 is amplified by a limiter intermediate frequency amplifier 44 which keeps its output at constant amplitude and feeds this to phase comparator 46. The output of mixer 41 is connected to a linear intermediate frequency amplifier 45 and its output is also connected to phase comparator 46 which compares the phase of the outputs of the two amplifiers 44 and 45 and drives a voltage controlled oscillator 47 which establishes the signal in slotted line 21a. Voltage controlled oscillator 47 may be of the type having a voltage variable capacitor (varactor) as part of a resonant circuit of a conventional oscillator.

If probe 27a is to the right of the null a positive signal is produced, and to the left of null 25 a negative signal is produced in a manner analogous to the magic tee-diode detector arrangement of the first embodiment, which is simulated at intermediate frequencies by the phase comparator. These signals are sent to voltage controlled oscillator 47 thereby controlling its output frequency in line 21a so that the null 25a corresponds with the probe position 27a, closing the servo loop.

The use of the superheterodyne circuit in FIGURE 2 not only reduces noise but also permits intermediate frequency amplification of the signal to phase comparator 46, improving the sensitivity of the system.

In order to keep the intermediate frequency from mixers 41 and 42 in the band pass of amplifiers 44 and 45 and phase comparator 46, a discriminator 50 receives the frequency from amplifier 44 and changes this to a voltage corresponding to the frequency thus tuning voltage controlled oscillator 43 so that the intermediate frequency is maintained in the band pass regions.

Frequency readout 51 indicates the frequency change so that the movement of probe 27a is accurately known.

Although this invention has been disclosed and illustrated with reference to particular applications, the principles involved are susceptible of numerous other applications which will be apparent to persons skilled in the art. The invention is, therefore, to be limited only as indicated by the scope of the appended claims.

Having thus described my invention, I claim:

1. Voltage measuring device for measuring standing waves in waveguide means comprising
waveguide means,
frequency generating means for effecting a standing wave in said waveguide means,
first probe means for measuring a reference voltage corresponding to a portion of the standing wave voltage in said waveguide means,
second probe means moavble relative to said first probe means and movable along the waveguide means to measure the standing wave voltage in said waveguide means,
comparing means,
said first and second probe means being connected to said comparing means to compare the reference voltage and the standing wave voltage thereby developing a signal corresponding to the relative position of said second probe means and said standing wave,
said first probe means being positioned relative to said waveguide means to measure a portion of said standing wave in said waveguide means as the reference voltage,
said second probe means being connected to and moved by an object the displacement of which is to be measured,
voltage controlled oscillator means to change the frequency of the signal in said waveguide means,
said oscillator means being connected between the output of said comparing means and said frequency generating means to change the frequency of the signal in said waveguide means until the comparing means output sends a zero signal to said oscillator means,
means to count the frequency change.

2. Voltage measuring device for measuring standing waves in waveguide means comprising
waveguide means,
frequency generating means for effecting a standing wave in said waveguide means,
first probe means for measuring a reference voltage corresponding to a portion of the standing wave voltage in said waveguide means,
second probe means movable relative to said first probe means and movable along the waveguide means to measure the standing wave voltage in said waveguide means,
comparing means,
said first and second probe means being connected to said comparing means to compare the reference voltage and the standing wave voltage thereby developing a signal corresponding to the relative position of said second probe means and said standing wave,
a magic tee having two symmetric arms, a sum arm and a difference arm,
said first probe means being connected to one of said symmetric arms and said second probe means being connected to the other of said symmetric arms,
a rectifier being connected to the sum arm for passing current in one direction from said magic tee and a rectifier being connected to said difference arm for passing current in the other direction from said magic tee,
said rectifiers being connected to resistance means across which the output signal is developed.

3. Voltage measuring device for measuring standing waves in waveguide means comprising
waveguide means,
frequency generating means for effecting a standing wave in said waveguide means,
first probe means for measuring a reference voltage corresponding to a portion of the standing wave voltage in said waveguide means,
second probe means movable relative to said first probe means and movable along the waveguide means to measure the standing wave voltage in said waveguide means,
comparing means,
said first and second probe means being connected to said comparing means to compare the reference voltage and the standing wave voltage thereby developing a signal corresponding to the relative position of said second probe means and said standing wave, said first probe means is positioned relative to said waveguide means to measure a portion of said standing wave in said waveguide means as the reference voltage, said second probe means is connected to and moved by an object the displacement of which is to be measured, voltage controlled oscillator means to change the frequency of the signal in said waveguide means, said oscillator means being connected between the output of said comparing means and said frequency generating means to change the frequency of the signal in said waveguide means until the comparing means output sends a zero signal to said oscillator means, means to count the frequency change, two mixers, a local oscillator driving said mixers, said first probe means being connected to a first of said mixers and said second probe means being connected to the second of said mixers, a phase comparator, said mixers being connected to said phase comparator.

4. The device of claim 3 where said local oscillator is voltage controlled, a discriminator being connected between said first mixer to change frequency changes from said first mixer to voltage changes to said controlled local oscillator so that said last named oscillator will generate a frequency which when subtracted from the probe frequencies will result in a substantially constant intermediate frequency.

5. The device of claim 3 having a limiter intermediate frequency amplifier between said first mixer and phase comparator, a linear intermediate frequency amplifier being between said second mixer and said phase comparator.

6. Apparatus comprising generating means for generating a variable high frequency electromagnetic signal, conductor means for receiving said high frequency electromagnetic signal at one end thereof, means for terminating the other end of said conductor means to produce an electromagnetic standing wave therein, first probe means for measuring a reference voltage corresponding to a portion of the standing wave voltage in said conductor means, second probe means movable along the conductor means to measure the standing wave voltage in said conductor means, means for providing movement of said second probe means along said conductor means in response to the object displacement between a reference position and a position to be measured, said first and second probe means being sensitive to the amplitude of the electromagnetic standing wave in said conductor means, comparing means, said first and second probe means being connected to said comparing means to compare the reference voltage and the standing wave voltage thereby developing a position signal corresponding to the relative position of said second probe means and said standing wave, means for changing the frequency of the signal in said generating means after the second probe means has been moved so that a null can be obtained at said second probe means, means for indicating the frequency change so that the displacement of said second probe means can be obtained.

7. The apparatus of claim 6 with said means for changing the frequency being responsive to said position signal.

8. A method comprising the steps of establishing an electromagnetic standing wave, measuring one portion of the standing wave, measuring a second portion of the standing wave at a first position spaced from said first measurement, moving said second measurement point to a second position on the electromagnetic standing wave corresponding to a displacement to be measured, changing the frequency of the standing wave so that a null of the standing wave can be obtained at the second measurement position of the standing wave, measuring the frequency change required to obtain a null point at the second position in order to determine the displacement of the second measurement.

References Cited by the Examiner

UNITED STATES PATENTS

| | | | |
|---|---|---|---|
| 2,602,827 | 7/1952 | Miller | 324—58 X |
| 2,758,663 | 8/1956 | Snavely. | |
| 2,967,996 | 1/1961 | Bradford | 324—81 X |
| 3,122,665 | 2/1964 | Bailey | 324—68 |

WALTER L. CARLSON, *Primary Examiner.*

R. V. ROLINEC, A. E. RICHMOND, P. F. WILLE, *Assistant Examiners.*